United States Patent
Thimmareddy et al.

(10) Patent No.: US 12,524,241 B2
(45) Date of Patent: Jan. 13, 2026

(54) SYSTEM AND METHOD FOR AUTOMATED COMMAND ACCESS APPROVAL ACROSS A NETWORK OF SERVERS

(71) Applicant: BANK OF AMERICA CORPORATION, Charlotte, NC (US)

(72) Inventors: Arjun Thimmareddy, Charlotte, NC (US); Virinchi Ande, Charlotte, NC (US); Aarron Gull, East Northport, NY (US); Sreedhar Pagadala, Charlotte, NC (US); Lance Cline Berry, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 234 days.

(21) Appl. No.: 17/879,354

(22) Filed: Aug. 2, 2022

(65) Prior Publication Data
US 2024/0045693 A1 Feb. 8, 2024

(51) Int. Cl.
*G06F 9/38* (2018.01)
*G06F 18/22* (2023.01)
*G06K 9/62* (2022.01)
*H04L 9/00* (2022.01)

(52) U.S. Cl.
CPC ............ *G06F 9/3836* (2013.01); *G06F 18/22* (2023.01); *H04L 9/50* (2022.05)

(58) Field of Classification Search
CPC ........... G06F 9/3836; G06F 18/22; H04L 9/50
USPC ........................................................ 713/168
See application file for complete search history.

(56) References Cited

U.S. PATENT DOCUMENTS

| | | | |
|---|---|---|---|
| 7,889,847 B2 * | 2/2011 | Gainsboro | H04M 3/38 379/188 |
| 8,494,832 B2 * | 7/2013 | Krishnan | G06F 11/3696 703/22 |
| 8,677,315 B1 * | 3/2014 | Anderson | G06F 8/60 717/124 |
| 9,516,053 B1 * | 12/2016 | Muddu | G06F 3/04847 |
| 9,612,821 B2 | 4/2017 | Iyer | |
| 9,886,269 B2 | 2/2018 | Grillo | |
| 10,310,968 B2 | 6/2019 | Biddle | |
| 10,545,855 B1 | 1/2020 | Jayaswal | |
| 10,656,927 B2 | 5/2020 | Hawrylo | |
| 10,713,594 B2 | 7/2020 | Szeto | |
| 10,795,801 B2 | 10/2020 | Raviv | |
| 10,810,115 B2 | 10/2020 | Manchiraju | |

(Continued)

*Primary Examiner* — Sharon S Lynch
*Assistant Examiner* — Pegah Barzegar
(74) *Attorney, Agent, or Firm* — Moore & Van Allen PLLC; Nicholas C. Russell

(57) ABSTRACT

Systems, computer program products, and methods are described herein for providing automated command access approval across a network. The method includes receiving a request for a command execution to be performed on a first node. The request for the command execution indicates a user attempting to execute the command on the first node. The method also includes comparing the request for command execution to one or more previous command execution determinations. The one or more previous command execution determinations are associated with the command to be performed. The method further includes determining an execution decision based on the comparison of the request for command execution to one or more previous command execution determinations.

17 Claims, 5 Drawing Sheets

(56) References Cited

U.S. PATENT DOCUMENTS

| | | | |
|---|---|---|---|
| 10,869,199 B2 | 12/2020 | Raleigh | |
| 10,901,727 B2 | 1/2021 | Biddle | |
| 10,915,316 B1 | 2/2021 | Turner | |
| 10,997,150 B2 | 5/2021 | Chui | |
| 11,003,568 B2 | 5/2021 | Smith | |
| 11,038,784 B2 | 6/2021 | Nickolov | |
| 11,042,524 B1* | 6/2021 | Huang | H04L 9/3247 |
| 11,138,343 B2* | 10/2021 | Sofia | G06F 16/24573 |
| 11,764,968 B2* | 9/2023 | Huber | H04L 67/01 |
| | | | 713/168 |
| 11,803,510 B2* | 10/2023 | Gentile | G06F 16/1734 |
| 11,803,927 B2* | 10/2023 | Lee | G06Q 50/184 |
| 11,985,263 B1* | 5/2024 | Liu | H04L 9/3239 |
| 2005/0097320 A1* | 5/2005 | Golan | G06Q 20/4014 |
| | | | 713/166 |
| 2007/0250502 A1* | 10/2007 | Canright | G06F 16/35 |
| | | | 707/999.005 |
| 2013/0111212 A1* | 5/2013 | Baltes | G06F 21/64 |
| | | | 713/176 |
| 2016/0239851 A1* | 8/2016 | Tanner, Jr. | G06Q 10/067 |
| 2017/0212829 A1 | 7/2017 | Bales | |
| 2017/0372247 A1 | 12/2017 | Tauber | |
| 2018/0159744 A1* | 6/2018 | Tee | H04L 41/046 |
| 2019/0179939 A1* | 6/2019 | Govindarajan | G06F 16/2358 |
| 2019/0294528 A1 | 9/2019 | Avisror | |
| 2020/0380112 A1* | 12/2020 | Allen | G06F 21/44 |
| 2020/0396260 A1* | 12/2020 | Nahas | G06F 18/22 |
| 2020/0412541 A1* | 12/2020 | Yang | H04L 63/0861 |
| 2021/0192494 A1* | 6/2021 | Capurso | G06Q 20/4014 |
| 2021/0200662 A1* | 7/2021 | Li | G06N 20/00 |
| 2021/0240758 A1* | 8/2021 | Lee | G06F 40/205 |
| 2021/0357927 A1* | 11/2021 | Kita | G06Q 20/38215 |
| 2022/0076048 A1* | 3/2022 | Rossi | G06F 18/2113 |
| 2022/0207022 A1* | 6/2022 | Wood | G06F 16/2379 |
| 2022/0236904 A1* | 7/2022 | Miller | G06F 3/0688 |
| 2022/0417275 A1* | 12/2022 | Jones | H04L 63/1483 |
| 2023/0019410 A1* | 1/2023 | Nakov | G06F 16/906 |
| 2023/0047924 A1* | 2/2023 | Teutsch | H04L 9/50 |
| 2023/0065773 A1* | 3/2023 | Dimitriou | G06F 18/22 |
| 2023/0308287 A1* | 9/2023 | Pettit | H04L 9/50 |
| 2023/0316005 A1* | 10/2023 | Saxe | G06F 40/56 |
| 2023/0319036 A1* | 10/2023 | Singh | H04L 63/107 |
| | | | 726/4 |
| 2023/0342781 A1* | 10/2023 | Deutsch | G06Q 20/4016 |
| 2024/0045693 A1* | 2/2024 | Thimmareddy | G06F 18/22 |
| 2024/0152400 A1* | 5/2024 | Posner | G06F 9/5072 |

* cited by examiner

SYSTEM AND METHOD FOR AUTOMATED COMMAND ACCESS APPROVAL ACROSS A NETWORK OF SERVERS

FIELD OF THE INVENTION

Example embodiments of the present disclosure relate generally to command access approval and, more particularly, to the automated command access approval across a network of servers.

BACKGROUND

Commands are often executed multiple times across given nodes by a user. However, current systems require that the command must be approved for execution for each given node. Applicant has identified a number of deficiencies and problems associated with command access approval. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In an example embodiment, a system for providing automated command access approval across a network is provided. The system includes at least one non-transitory storage device and at least one processing device coupled to the at least one non-transitory storage device. The at least one processing device is configured to receive a request for a command execution to be performed on a first node. The request for the command execution indicates a user attempting to execute a command on the first node. The at least one processing device is also configured to compare the request for command execution to one or more previous command execution determinations. The one or more previous command execution determinations are associated with the command to be performed. The at least one processing device is further configured to determine an execution decision based on the comparison of the request for command execution to one or more previous command execution determinations.

In various embodiments, the at least one processing device is further configured to determine a similarity score for the request for the command execution with the similarity score indicating a similarity between the request for the command execution and the one or more previous command execution determinations. In various embodiments, the execution decision is to approve the request for command execution by the user in an instance in which the similarity score is above a threshold similarity rating. In various embodiments, the execution decision is to reject the request for command execution by the user in an instance in which the similarity score is below a threshold similarity rating. In various embodiments, the similarity score for the request for the command execution is based on at least one of node type, user executing the command, command type, or application related to a given node.

In various embodiments, the first node is associated with a first application. In various embodiments, the one or more previous command execution determinations are stored in a blockchain database. In various embodiments, each of the one or more previous command execution determinations are associated with a node on which the command was performed. In such an embodiment, the comparison of the request for command execution to one or more previous command execution determinations is based on similarities between the nodes on which each of the one or more previous command execution determinations are associated and the first node.

In another example embodiment, a computer program product for providing automated command access approval across a network is provided. The computer program product includes at least one non-transitory computer-readable medium having computer-readable program code portions embodied therein. The computer-readable program code portions include an executable portion configured to receive a request for a command execution to be performed on a first node. The request for the command execution indicates a user attempting to execute a command on the first node. The computer-readable program code portions also include an executable portion configured to compare the request for command execution to one or more previous command execution determinations. The one or more previous command execution determinations are associated with the command to be performed. The computer-readable program code portions further include an executable portion configured to determine an execution decision based on the comparison of the request for command execution to one or more previous command execution determinations.

In various embodiments, the computer-readable program code portions also include determine a similarity score for the request for the command execution with the similarity score indicating a similarity between the request for the command execution and the one or more previous command execution determinations. In various embodiments, the execution decision is to approve the request for command execution by the user in an instance in which the similarity score is above a threshold similarity rating. In various embodiments, the execution decision is to reject the request for command execution by the user in an instance in which the similarity score is below a threshold similarity rating. In various embodiments, the similarity score for the request for the command execution is based on at least one of node type, user executing the command, command type, or application related to a given node.

In various embodiments, the first node is associated with a first application. In various embodiments, the one or more previous command execution determinations are stored in a blockchain database. In various embodiments, each of the one or more previous command execution determinations are associated with a node on which the command was performed. In such an embodiment, the comparison of the request for command execution to one or more previous command execution determinations is based on similarities between the nodes on which each of the one or more previous command execution determinations are associated and the first node.

In still another example embodiment, a computer-implemented method for providing automated command access approval across a network is provided. The method includes receiving a request for a command execution to be performed on a first node. The request for the command execution indicates a user attempting to execute a command on the first node. The method also includes comparing the request for command execution to one or more previous command execution determinations. The one or more previous command execution determinations are associated with the command to be performed. The method further includes determining an execution decision based on the comparison of the request for command execution to one or more previous command execution determinations.

In various embodiments, the method also includes determining a similarity score for the request for the command execution with the similarity score indicating a similarity between the request for the command execution and the one or more previous command execution determinations. In various embodiments, the execution decision is to approve the request for command execution by the user in an instance in which the similarity score is above a threshold similarity rating. In various embodiments, the execution decision is to reject the request for command execution by the user in an instance in which the similarity score is below a threshold similarity rating. In various embodiments, the similarity score for the request for the command execution is based on at least one of node type, user executing the command, command type, or application related to a given node.

In various embodiments, the one or more previous command execution determinations are stored in a blockchain database. In various embodiments, each of the one or more previous command execution determinations are associated with a node on which the command was performed. In such an embodiment, the comparison of the request for command execution to one or more previous command execution determinations is based on similarities between the nodes on which each of the one or more previous command execution determinations are associated and the first node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION OF EMBODIMENTS OF THE INVENTION

Figure 1A:
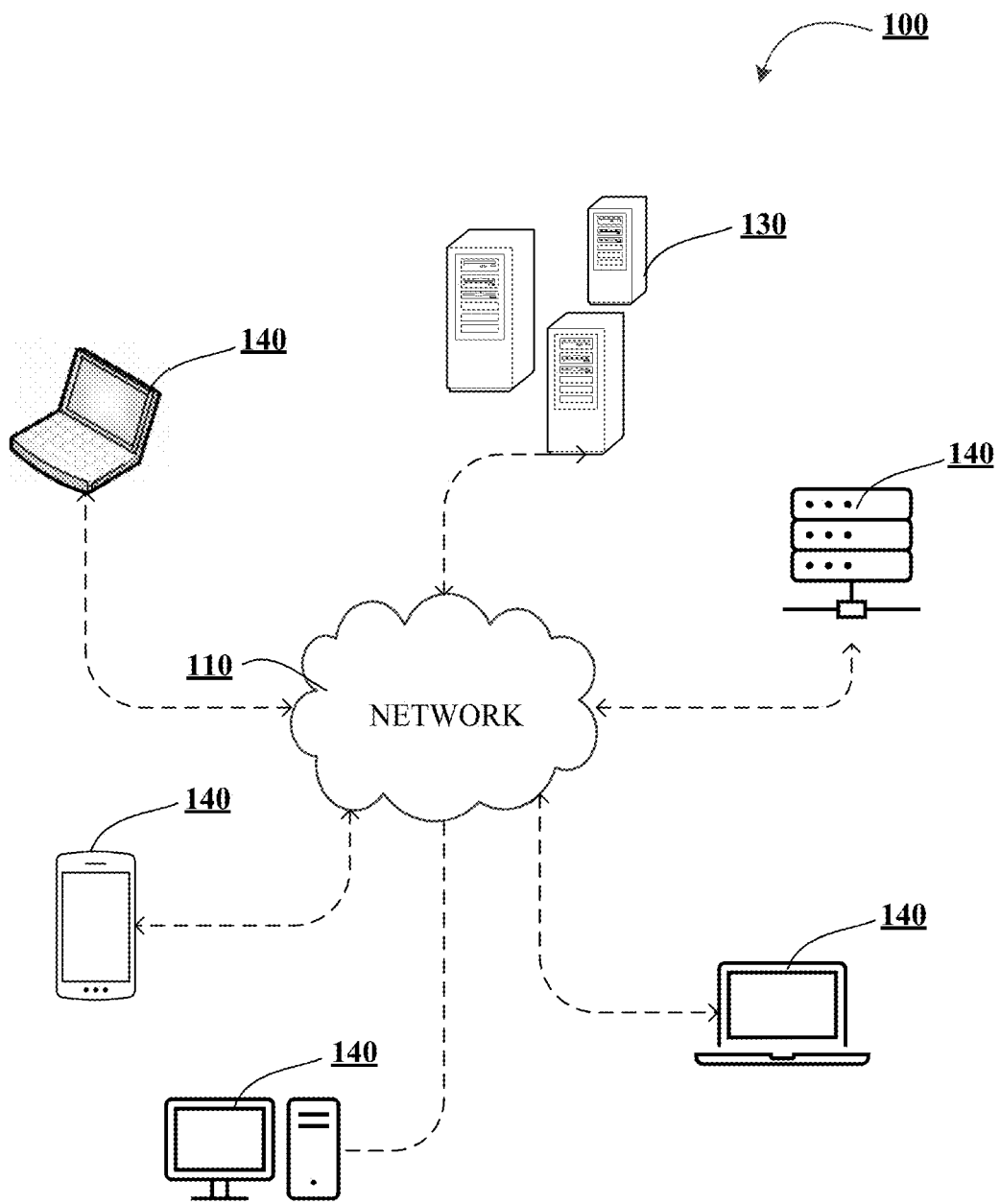
FIGS. 1A-1C illustrates technical components of an exemplary distributed computing environment for providing automated command access approval across a network of servers, in accordance with an embodiment of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system.

In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Nodes (e.g., servers) associated with an application have various commands carried out by one or more users (e.g., programmers) to update and continually improve the nodes. Additionally, similar commands may be carried out on multiple nodes that are associated with the same application. However, under current protocols, individual approvals must be given for each individual nodes, resulting in delay in updates, which in turn can present security and/or performance issues in the nodes. The individual approvals for each individual nodes are to protect the network, since the nodes are different and therefore may have issues with a command that other nodes did not have. However, some nodes have similarities, especially nodes that are associated with the same application, which results in less potential for unwarranted effects due to execution of a command.

Various embodiments of the present disclosure provide for automated command approval for a node (e.g., server) based on previous command approvals for related nodes. To provide automated approval of commands, the system is configured to compare the node to other related nodes to determine whether previous command execution determinations can be used in place of a manual review of a request for command execution. As such, the system is configured to receive a request for a command execution. The request for a command execution may include the node on which the command is to be executed, the application to which the node is associated, the user or team executing the command, and/or the like. The request for command execution is then compared to one or more previous command execution determinations for the command on related nodes. The one or more previous command execution determinations may be stored on a blockchain database that includes information relating to the previous command execution determinations, such as the node on the which the command was executed, the application to which the node is associated, the user or team executing the command, and/or the like. Based on the comparison between the request for command execution and the one or more previous command execution determinations, the system determines if a similarity score between the request for command execution and the one or more previous command execution determinations allow for the request for command execution to be automatically approved. If the similarity score is below a threshold similarity score, the system may either automatically reject the request for command execution or request manual review of the request for command execution.

The present disclosure provides a technical solution to a technical problem. As described herein, the technical problem includes improving command execution approval, resulting in increased security and performance by allowing commands to be approved for execution more quickly than traditional approaches.

Figure 1B:
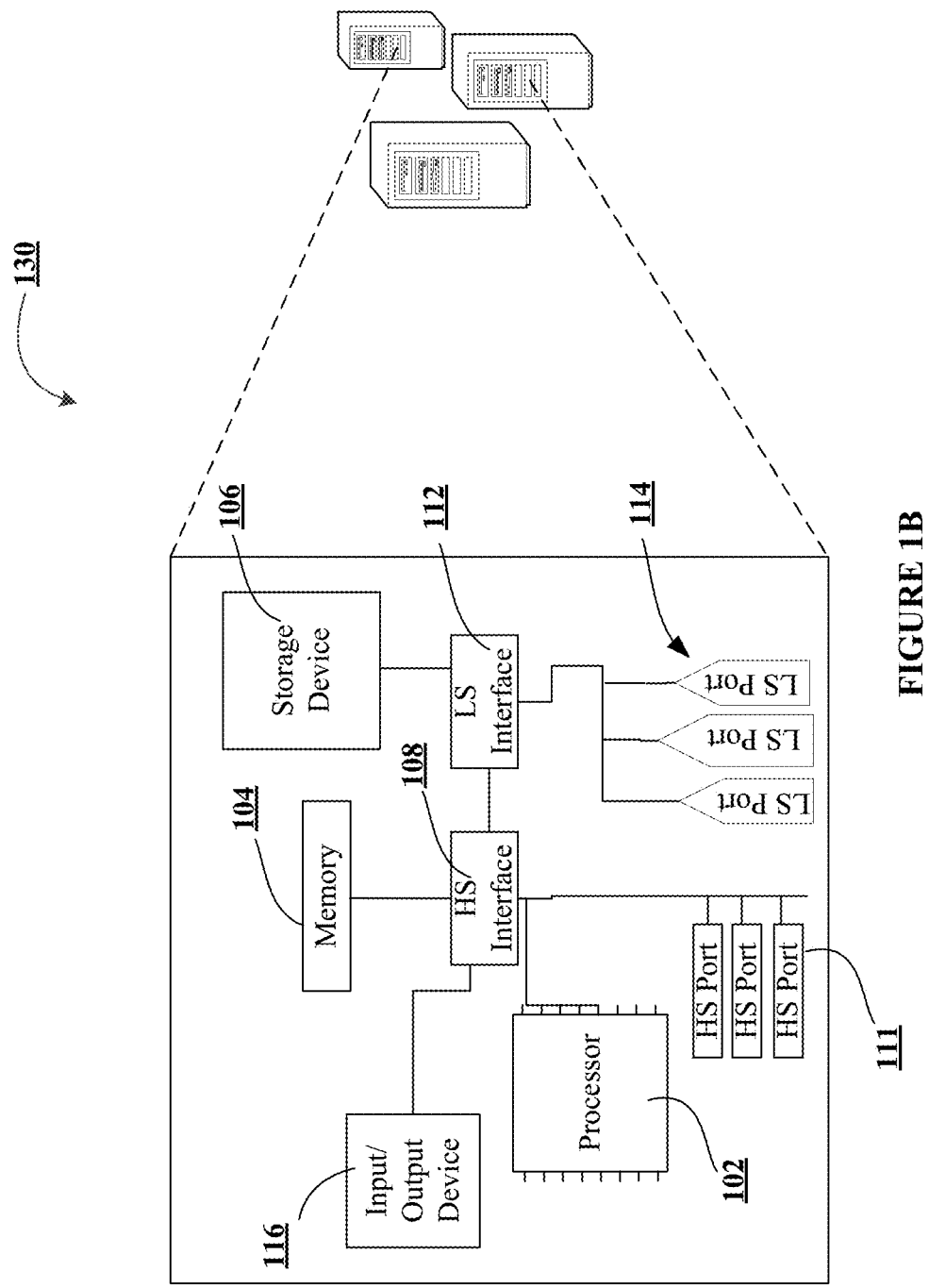
Figure 1C:
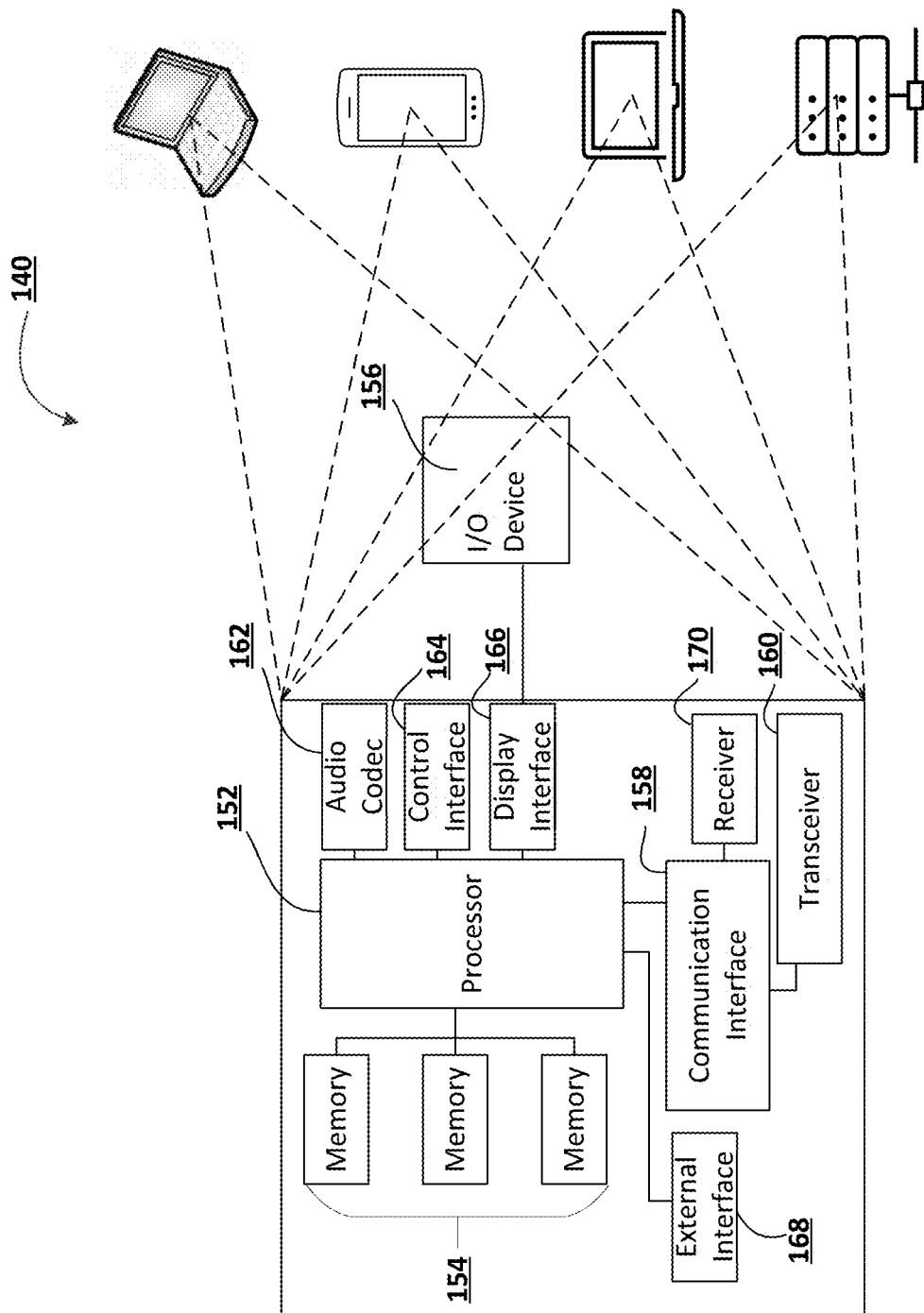

FIGS. 1A-1C illustrate technical components of an exemplary distributed computing environment for providing automated command access approval across a network of servers, in accordance with an embodiment of the disclosure. As shown in FIG. 1A, the distributed computing environment 100 contemplated herein may include a system 130 (i.e., an authentication credential verification), an end-point device (s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
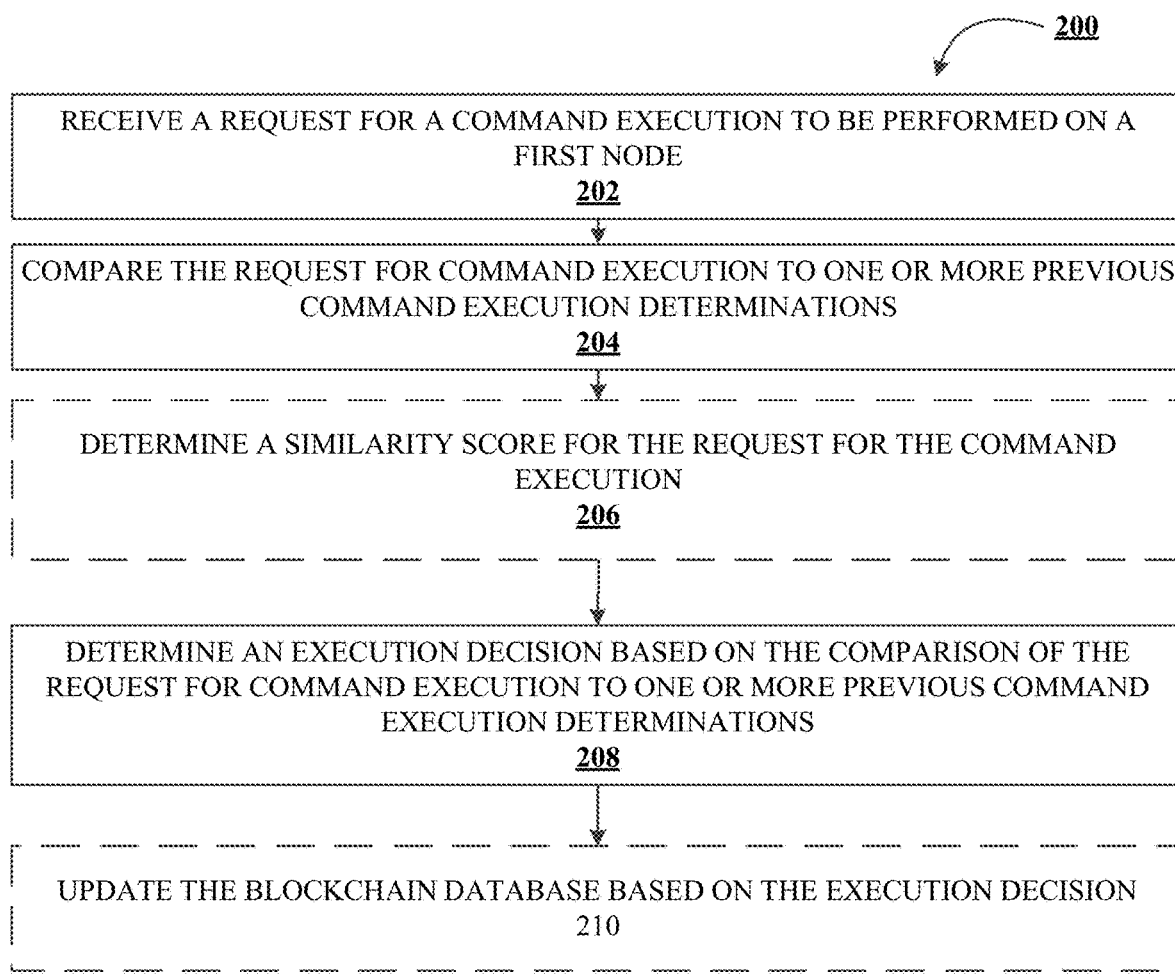
FIG. 2 illustrates a process flow for providing automated command access approval across a network of servers, in accordance with an embodiment of the present disclosure.

FIG. 2 is a flow chart 200 that illustrates another example method of controlling access security protocols in a database management system. The method may be carried out by various components of the distributed computing environment 100 discussed herein (e.g., the system 130, one or more end-point devices 140, etc). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving a request for a command execution to be performed on a first node. The request for a command execution indicates a user attempting to execute the command on the first node. The first node may be a server associated with a first application. The request for the command execution may also include additional information relating to the command to be executed. In some instances, the request for the command execution may be the user attempting to execute the command execution (e.g., the system may receive the command execution and then determine whether to allow execution). Additionally or alternatively, the user may request permission to perform one or more commands before the commands are to be executed.

Referring now to Block 204 of FIG. 2, the method includes comparing the request for command execution to one or more previous command execution determinations. The one or more previous command execution determinations are associated with the command to be performed. The one or more previous command execution determinations may be instances in which the command was performed on a node associated with the same application as the first node (e.g., the first application).

In various embodiments, the one or more previous command execution determinations may be stored in a blockchain database. The blockchain database allows for previous command execution determinations for a given node to be associated with one another. For example, the blockchain database may include approvals and rejections associated with one or more nodes. While the database may be stored in a traditional database, blockchain technology allows for increased security due to the ability to tag the previous command execution determinations with the associated nodes.

Each of the one or more previous command execution determinations are associated with a node on which the command was performed. As such, the comparison of the request for command execution to one or more previous command execution determinations is based on similarities between the nodes on which each of the one or more previous command execution determinations are associated and the first node. An example comparison is discussed in reference to optional Block 206 below. Various comparisons may be carried out between the previous command execution determination(s) and the request for the command execution.

Figure 3:
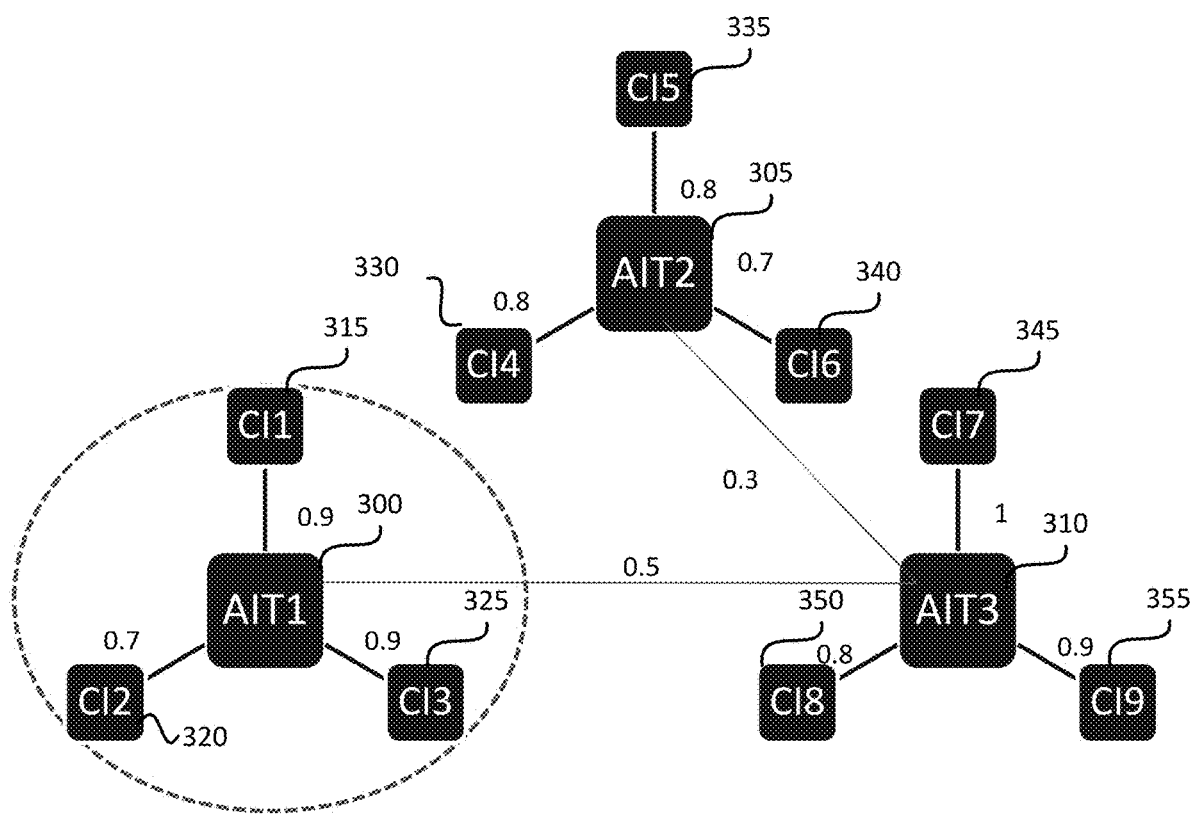
FIG. 3 illustrates an infrastructure dependency chart used to determine the similarities between nodes in various embodiments of the present disclosure.

Referring now to optional Block 206 of FIG. 2, the method includes determining a similarity score for the request for the command execution. The similarity score indicates the similarity between the request for the command execution and the one or more previous command execution determinations. In various embodiments, the similarity score for the request for the command execution may be based on at least one of node type, user executing the command, command type, or application related to a given node. For example, as shown in FIG. 3, the scaling values for the similarity score is higher for nodes associated with the same application. Additionally, the type of processing for a node may also affect the similarity score. For example, two nodes may have similar processing operations and therefore a command would likely operate similarly on both nodes.

Referring now to Block 208 of FIG. 2, the method includes determining an execution decision based on the comparison of the request for command execution to one or more previous command execution determinations. In various embodiments, the execution decision may be to automatically approve the request, automatically reject the request, or recommend manual review of the request. The execution decision may be based on the similarity between the request for command execution and the one or more previous command execution determinations.

In an instance in which the system determines a similarity score for the request, the execution decision may be based on whether the similarity score meets a threshold similarity value. For example, in an instance in which the similarity score is above the threshold similarity value, the request for command execution may be approved and in an instance in which the similarity score is below the threshold similarity value, the request for command execution may be rejected or marked for manual review. The threshold similarity value may be based on the desired security level of the network. For example, the higher the threshold similarity value, the more secure the network will be since the similarity score would need to be higher to automatically approve the request for command execution.

Referring now to optional Block 210 of FIG. 2, the method includes updating the blockchain database based on the execution decision. As discussed above, the one or more previous command execution determinations may be stored on a blockchain database. As such, the blockchain database may be subsequently updated after every execution decision. The blockchain database may be updated with the execution decision along with information relating to the request for command executing, including node, command, user performing the command, and/or the like. As such, the blockchain database may be a distributed ledger that includes various execution decisions across various nodes. While the blockchain database is discussed as a singular blockchain, various embodiments may use multiple blockchains to store various previous command execution determinations. For example, each node may have an individual blockchain or fork in a blockchain.

FIG. 3 illustrates an infrastructure dependency chart used in various embodiments to determine the similarity between nodes for use in the method of FIG. 2. As shown, the network has three applications (AIT1 300, AIT2 305, and AIT3 310) with each of the application having one or more nodes (e.g., CI1 315, CI2 320, CI3 325, etc.). The infrastructure dependency chart shown is focused on the similarity of the nodes associated with AIT1 300 (e.g., CI1 315, CI2 320, CI3 325). Each of the nodes have scaling values associated with other nodes associated with the same application. For example, CI1 315 and CI3 325 each have a scaling value of 0.9 and CI2 320 has a scaling value of 0.7. The scaling value may correspond to a percentage similarity to other application associated with the same application (e.g., CI2 320 is 70% similar to other nodes associated with the application).

In various embodiments, the scaling values may be used across different applications. For example, as shown, AIT3 310 has a 0.5 scaling value in reference to AIT1 300. As such, the similarity score of any node in AIT3 310 (e.g., CI7 345, CI8 350, and/or CI9 355) is factored by 0.5 along with the individual scaling value. As such, for example, the similarity score for a command to be performed on a node of AIT1 may be multiplied by 0.5 (the AIT3 310 scaling value) and 0.9 (the CI9 355 scaling value) in an instance in which a previous command execution determination is associated with CI9 355.

Additionally, AIT2 305 has a further scaling value from AIT3 310. As shown, the AIT2 has a scaling value of 0.3 from AIT3 310. As such, the similarity score of any node in AIT2 305 (e.g., CI4 330, CI5 335, and/or CI6 340) is factored by the AIT3 310 scaling value (0.5) and the AIT2 scaling value (0.3) along with the individual scaling value. Therefore, in an instance in which the similarity score for a command to be performed on a node of AIT1 may be multiplied by 0.5 (the AIT3 310 scaling value), 0.3 (the AIT 2 305 scaling value), and 0.8 (the CI5 335 scaling factor) in an instance in which a previous command execution determination is associated with CI5 335.

The scaling values for the applications and/or nodes may be automatically created based on processor similarities. Alternatively, a user may define the scaling values for each application and/or node.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing automated command access approval across a network, the system comprising:
    at least one non-transitory storage device; and
    at least one processing device coupled to the at least one non-transitory storage device, wherein the at least one processing device is configured to execute computer-readable program code to:
        receive a request for a command execution to be performed on a first node, wherein the request for the command execution indicates a user attempting to execute a command on the first node;
        compare the request for the command execution to one or more previous command execution determinations, wherein the one or more previous command execution determinations are associated with the command to be performed, wherein each of the one or more previous command execution determinations are associated with a node on which the command was performed, wherein comparison of the request for the command execution to the one or more previous command execution determinations are associated with the node on which the command was performed, the comparison including an evaluation of application-level scaling values and node-level scaling values assigned to the node on which the command was performed;
        determine, based on the application-level scaling values and the node-level scaling values, an evaluation outcome for the request for the command execution relative to the one or more previous command execution determinations, wherein scaling values are representative of processing characteristics, node type, command type, user context, and application relationships;
        present an infrastructure dependency chart comprising a visual representation of the node-level scaling values and the application-level scaling values, wherein the infrastructure dependency chart depicts associations between nodes associated with the one or more previous command execution determinations and applications based on node type, user executing the request for the command, a command type, processing characteristics, and application related to a given node;
        determine an execution decision based on the comparison of the request for the command execution to the one or more previous command execution determinations; and
        update a distributed ledger with the execution decision, wherein the update includes the command execution, the first node, and the user.

2. The system of claim 1, wherein the at least one processing device is configured to determine a similarity score for the request for the command execution, wherein the similarity score indicates a similarity between the request for the command execution and the one or more previous command execution determinations.

3. The system of claim 2, wherein the execution decision is to approve the request for the command execution by the user in an instance in which the similarity score is above a threshold similarity rating; or wherein the execution decision is to reject the request for the command execution by the user in an instance in which the similarity score is below a threshold similarity rating.

4. The system of claim 2, wherein the similarity score for the request for the command execution is based on at least one of node type, user executing the command, command type, or application related to a given node.

5. The system of claim 1, wherein the first node is associated with a first application.

6. The system of claim 1, wherein the one or more previous command execution determinations are stored in a blockchain database that comprises the distributed ledger.

7. A computer program product for providing automated command access approval across a network, the computer program product comprising at least one non-transitory computer-readable medium having computer-readable program code portions embodied therein, the computer-readable program code portions comprising:
    an executable portion configured to receive a request for a command execution to be performed on a first node, wherein the request for the command execution indicates a user attempting to execute a command on the first node;
    an executable portion configured to compare the request for the command execution to one or more previous command execution determinations, wherein the one or more previous command execution determinations are associated with the command to be performed, wherein each of the one or more previous command execution determinations are associated with a node on which the command was performed, wherein comparison of the request for the command execution to the one or more previous command execution determinations are associated with the node on which the command was performed, the comparison including an evaluation of application-level scaling values and node-level scaling values assigned to the node on which the command was performed;
    an executable portion configured to determine, based on the application-level scaling values and the node-level scaling values, an evaluation outcome for the request for the command execution relative to the one or more previous command execution determinations, wherein scaling values are representative of processing characteristics, node type, command type, user context, and application relationships;
    an executable portion configured to present an infrastructure dependency chart comprising a visual representation of the node-level scaling values and the application-level scaling values, wherein the infrastructure dependency chart depicts associations between nodes associated with the one or more previous command execution determinations and applications based on node type, user executing the request for the command, a command type, processing characteristics, and application related to a given node;

an executable portion configured to determine an execution decision based on the comparison of the request for the command execution to the one or more previous command execution determinations; and an executable portion configured to update a distributed ledger with the execution decision, wherein the update includes the command execution, the first node, and the user.

8. The computer program product of claim 7, wherein the computer program product further comprises an executable portion configured to determine a similarity score for the request for the command execution, wherein the similarity score indicates a similarity between the request for the command execution and the one or more previous command execution determinations.

9. The computer program product of claim 8, wherein the execution decision is to approve the request for the command execution by the user in an instance in which the similarity score is above a threshold similarity rating; or wherein the execution decision is to reject the request for the command execution by the user in an instance in which the similarity score is below a threshold similarity rating.

10. The computer program product of claim 8, wherein the similarity score for the request for the command execution is based on at least one of node type, user executing the command, command type, or application related to a given node.

11. The computer program product of claim 7, wherein the first node is associated with a first application.

12. The computer program product of claim 7, wherein the one or more previous command execution determinations are stored in a blockchain database that comprises the distributed ledger.

13. A computer-implemented method for providing automated command access approval across a network, the method comprising:

receiving a request for a command execution to be performed on a first node, wherein the request for the command execution indicates a user attempting to execute a command on the first node;

comparing the request for the command execution to one or more previous command execution determinations, wherein the one or more previous command execution determinations are associated with the command to be performed, wherein each of the one or more previous command execution determinations are associated with a node on which the command was performed, wherein comparison of the request for the command execution to the one or more previous command execution determinations are associated with the node on which the command was performed, the comparison including an evaluation of application-level scaling values and node-level scaling values assigned to the node on which the command was performed;

determining, based on the application-level scaling values and the node-level scaling values, an evaluation outcome for the request for the command execution relative to the one or more previous command execution determinations, wherein scaling values are representative of processing characteristics, node type, command type, user context, and application relationships;

presenting an infrastructure dependency chart comprising a visual representation of the node-level scaling values and the application-level scaling values, wherein the infrastructure dependency chart depicts associations between nodes associated with the one or more previous command execution determinations and applications based on node type, user executing the request for the command, a command type, processing characteristics, and application related to a given node;

determining an execution decision based on the comparison of the request for the command execution to the one or more previous command execution determinations; and updating a distributed ledger with the execution decision, wherein the update includes the command execution, the first node, and the user.

14. The method of claim 13, further comprising determining a similarity score for the request for the command execution, wherein the similarity score indicates a similarity between the request for the command execution and the one or more previous command execution determinations.

15. The method of claim 14, wherein the execution decision is to approve the request for the command execution by the user in an instance in which the similarity score is above a threshold similarity rating; or wherein the execution decision is to reject the request for the command execution by the user in an instance in which the similarity score is below a threshold similarity rating.

16. The method of claim 14, wherein the similarity score for the request for the command execution is based on at least one of node type, user executing the command, command type, or application related to a given node.

17. The method of claim 13, wherein the one or more previous command execution determinations are stored in a blockchain database that comprises the distributed ledger.

* * * * *